(12) United States Patent  (10) Patent No.: US 7,575,444 B2
Ikeda et al.  (45) Date of Patent: Aug. 18, 2009

(54) STRUCTURE FOR FIXING CONNECTION TERMINAL TO WIRING BOARD AND METHOD OF FIXING CONNECTION TERMINAL

(75) Inventors: Tomohiro Ikeda, Makinohara (JP); Kazuaki Saito, Makinohara (JP)

(73) Assignee: Yazaki Corporation, Tokyo (JP)

( * ) Notice: Subject to any disclaimer, the term of this patent is extended or adjusted under 35 U.S.C. 154(b) by 82 days.

(21) Appl. No.: 11/475,954

(22) Filed: Jun. 28, 2006

(65) Prior Publication Data

US 2007/0015398 A1   Jan. 18, 2007

(30) Foreign Application Priority Data

Jun. 28, 2005   (JP)   ............................ P2005-187923

(51) Int. Cl.
*H01R 12/00*   (2006.01)
(52) U.S. Cl. .................... 439/76.2; 439/733.1
(58) Field of Classification Search .............. 439/752.5, 439/733.1, 76.2
See application file for complete search history.

(56) References Cited

U.S. PATENT DOCUMENTS

| | | | | |
|---|---|---|---|---|
| 4,029,385 A | * | 6/1977 | Mysiak et al. | 439/557 |
| 4,273,408 A | * | 6/1981 | Orr | 439/737 |
| 4,432,594 A | * | 2/1984 | Daggett | 439/698 |
| 5,795,193 A | * | 8/1998 | Yang | 439/620.27 |
| 6,036,542 A | * | 3/2000 | Montague et al. | 439/595 |

FOREIGN PATENT DOCUMENTS

JP   2003-109686 A   4/2003

* cited by examiner

*Primary Examiner*—Tho D Ta
*Assistant Examiner*—Travis Chambers
(74) *Attorney, Agent, or Firm*—Sughrue Mion, PLLC

(57) ABSTRACT

A plate-shaped tip 32*d* of a connection terminal 32 is inserted and fitted into a slide groove 1*f* recessed into a substantially E-shaped partition wall 1*c* formed in a battery-connecting plate body 1. A fitting boss 1*h* is fitted into a fitting hole 32*c*. A base 32*e* of the connection terminal 32 is fitted into elastic claws 1*g*. A narrow portion 32*b* of the connection terminal 32 is fitted between regulating protrusions 1*i*.

4 Claims, 5 Drawing Sheets

STRUCTURE FOR FIXING CONNECTION TERMINAL TO WIRING BOARD AND METHOD OF FIXING CONNECTION TERMINAL

BACKGROUND OF THE INVENTION

1. Field of the Invention

The present invention relates to a structure for fixing a connection terminal to a battery-connecting plate connected to a battery cell used in, for example, electric vehicles, hybrid vehicles, etc. or a wiring board provided in an electrical connection box which applies, cuts off, or detects an electric current, and a method of fixing the connection terminal.

2. Description of the Related Art

In a conventional structure for fixing a connection terminal to a wiring board, a communicating hole or a slit is provided in a connection terminal, and a screw hole is provided in the wiring board. Also, the connection terminal is fixed to the wiring board by screwing a terminal screw into the screw hole through the communicating hole or the slit (for example, refer to JP-A-2003-109686 (Page 4, and FIG. 1))

However, if the number of connection terminals to be fixed to the wiring board increases, a fixing method or structure using the above-described connecting screw may be extremely troublesome and may require much more operational time.

As a matter of course, a constituent member such as a terminal screw is required separately, and the management thereof as well as assemblability is required. As a result, a problem occurs even in economic efficiency.

SUMMARY OF THE INVENTION

The invention has been conceived in consideration of such situations, and it is an object of the invention to provide a structure for fixing a connection terminal to a wiring board and a method of fixing the connection terminal, capable of solving the above problems.

In order to achieve the above-mentioned object, the following technical means are considered in a structure for fixing a connection terminal to a wiring board and a method of fixing the connection terminal according to the invention.

That is, according to claim 1 of the invention, a structure for fixing a connection terminal to a wiring board includes a connection terminal that has a base to which an electric wire is connected and a plate-shaped tip which is formed so as to be connected to the base; a slide groove which is provided in a constituent surface of a wiring board and is engaged with both ends of the tip in a width direction of the plate by causing the tip to be sled; and elastic claws which protrude upwardly from the constituent surface to sandwich the base therebetween.

According to claim 2 of the invention, the slide groove is formed substantially in a U shape in sectional view, which extends on the constituent surface along the constituent surface.

According to claim 3 of the invention, a fitting hole is provided in the tip, and a fitting boss which is engaged with the fitting hole protrudes from the constituent surface.

According to claim 4 of the invention, the tip is formed substantially in a T shape by a wide portion and a narrow portion which are fitted into the slide groove, and has regulating protrusions which protrude from the constituent surface so as to sandwich the narrow portion therebetween, and suppress pulling-out of the connection terminal.

According to the invention, since the plate-shaped tip of the connection terminal is engaged with the slide groove recessed in the constituent surface of the wiring board and the base of the connection terminal is fitted to the elastic claws protruding from the constituent surface, the connection terminal can be easily fixed to the wiring board without using any terminal screw.

Further, a fitting hole is provided in the tip and a fitting boss which is engaged with the fitting hole protrudes from the constituent surface, or the tip is formed substantially in a T shape, and regulating protrusions is provided protrude from the constituent surface so as to sandwich the narrow portion of the tip therebetween. Accordingly, pulling-out of the connection terminal can be suppressed.

Moreover, since a guide member to guide an electric wire connected to the base of the connecting terminal in a desired direction protrude from the constituent surface, harness constituted with the electric wire and connection terminal can be wired in good order.

DESCRIPTION OF THE PREFERRED EMBODIMENTS

Next, an embodiment of the structure for fixing a connection terminal to a wiring board according to the invention will be described.

In addition, as the structure for fixing a connection terminal to the wiring board according to the present embodiment, the following structure is exemplified. The structure is applied to a battery-connecting plate (wiring board) for collectively and electrically connecting a plurality of substantially rod-like battery cells, which are juxtaposed in a standing state, in electric vehicles using an electric motor, hybrid vehicles using both an electric motor and an internal combustion engine, etc.

Figure 1:
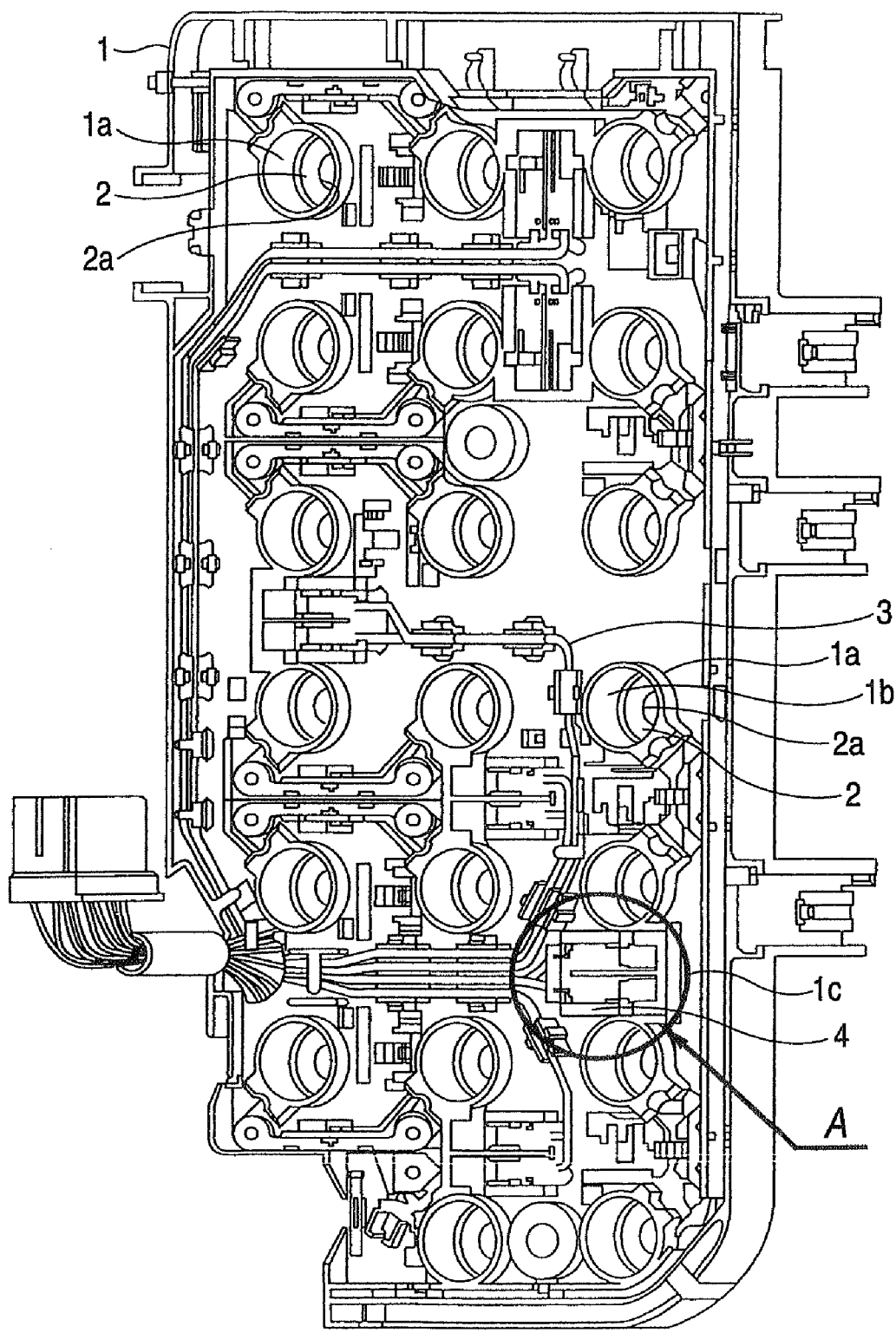
FIG. 1 is a perspective view of a battery-connecting plate to which a structure for fixing a connection terminal according to the present embodiment is applied.

This battery-connecting plate, as shown in FIG. 1, includes, as its fundamental components, a battery-connecting plate body 1 whose external appearance is formed substantially in a rectangular shape; bus bars (not shown) which are disposed at the back of the plate body so as to connect a plurality of battery cells in series to each other, each battery cell having a battery electrode terminal provided with a through hole for allowing a battery electrode formed to protrude from the tip of a battery cell to be inserted therethrough; a voltage detecting means (not shown) which detects the voltage state of each battery cell; a voltage-detecting terminal 2 which is disposed at the rear surface of the battery-connecting plate body 1 and extends to the surface (constituent surface) of the battery-connecting plate body 1 so as to overlap a battery electrode terminal provided with a through hole 2a for allowing a battery electrode formed to protrude from the tip of a battery cell to be inserted therethrough; and a connection terminal 32 whose tip 32d is connected to the voltage-detecting terminal 2 and whose base 32e is connected to an electric line 31. In addition, the electric line 31 and the connection terminal 32 constitute a harness 3.

In the battery-connecting plate configured as above, the battery-connecting plate body 1 and a battery cell are mechanically and electrically connected to each other to connect a plurality of battery cells in series to each other by fitting a battery terminal into the through hole of the battery electrode terminal and the through hole 2a of the voltage-detecting terminal 2 so as to be commonly inserted into them and fastening a nut (not shown) is fastened into a battery electrode protruding from the through hole 2a. Similar to this, each battery cell is connected to the voltage-detecting means via the connection terminal 32 to which the electric line 31 is connected, thereby detecting the voltage state of each battery cell.

Among them, the structure for fixing a connection terminal, that is, an essential part of the invention includes the harness 3 and a connecting portion 4 formed in a portion of the battery-connecting plate body 1. Hereinafter, the structure for fixing a connection terminal, that is, an essential part of the invention will be described.

The harness 3 includes connection terminals 32, and electric wires 31 that are connected to bases 32e of the connection terminal 32, respectively. Each of the connection terminals 32 includes a plate-like tip 32d and the base 32e formed integrally with the tip 32d. The tip 32d includes a wide portion 32a and a narrow portion 32b having a fitting hole 32b provided at its center, and is formed in a substantially T shape. The connection between the base 32e of the connection terminal 32 and the electric wire 31 is fixed by soldering a bare wire of the electric wire 31 to the base 32e and caulking the base 32e so that the base 32e is curled up from above a covering material covering the bare line.

Figure 2:
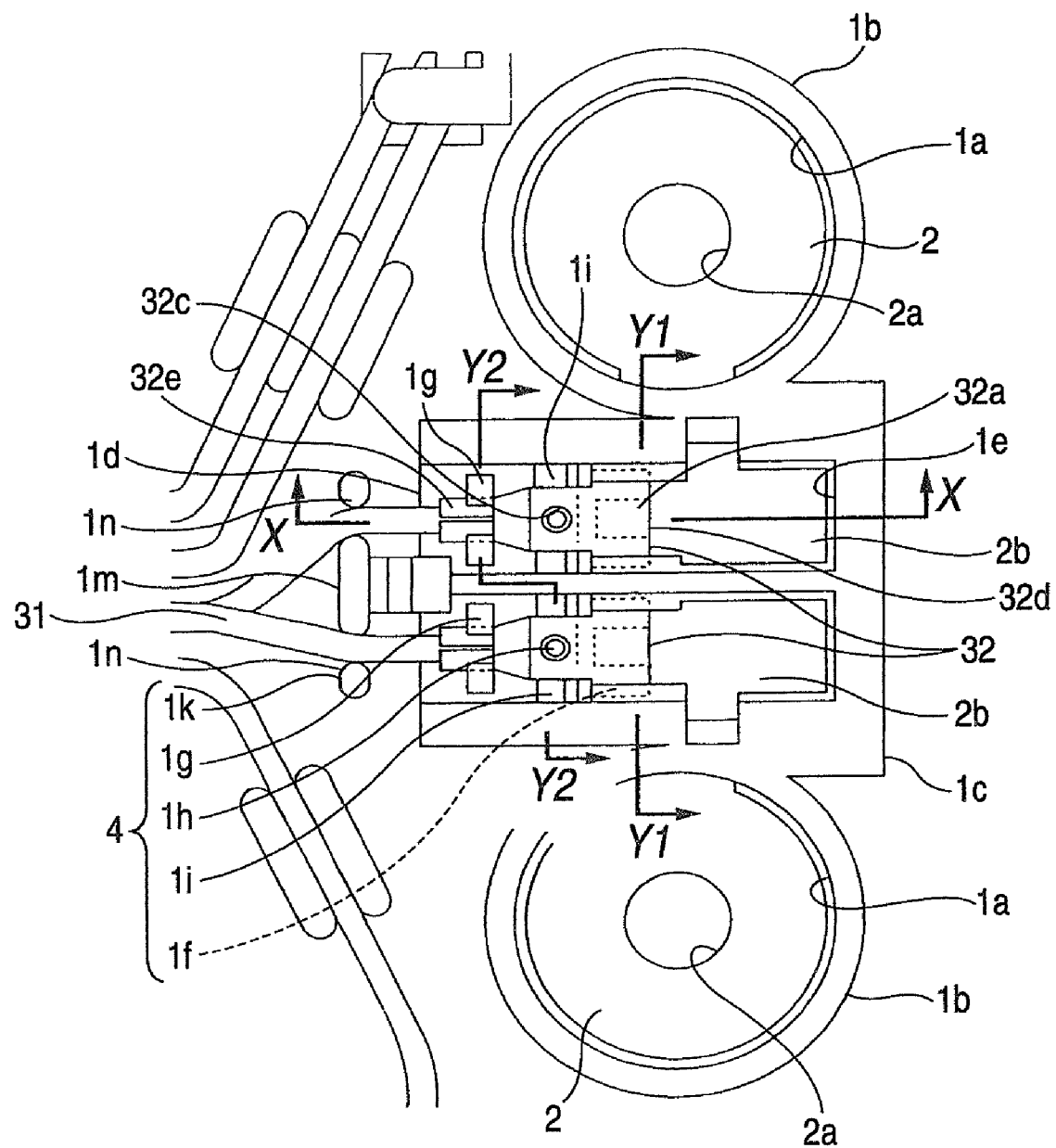
FIG. 2 is an enlarged plan view of portion A in FIG. 1.
Figure 3:
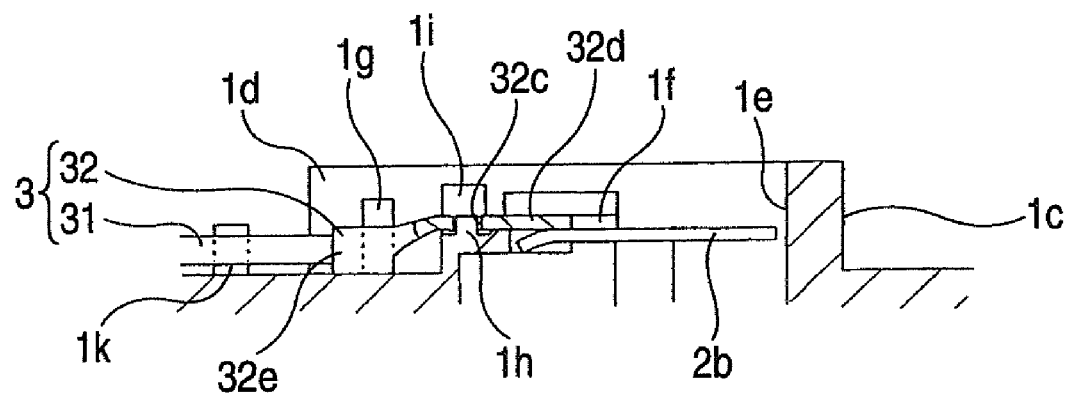
FIG. 3 is a partial sectional view taken along line X-X in FIG. 2.

In the battery-connecting plate body 1, as shown in FIGS. 2 and 3, a portion of the surface (constituent surface) of the battery-connecting plate body 1 is provided with a predetermined height of a substantially circular partition wall 1b provided with a communicating hole 1a for fastening a nut to a battery electrode protruding from a through hole, and a substantially E-shaped partition wall 1c which protrudes so as to be provided continuously with the partition wall 1b having its inner side recessed and inserted to a predetermined depth.

Further, forming the partition wall 1c in a substantially E-shape is to use its one side for a positive electrode and the other side for a negative side, and to partition the positive electrode and the negative electrode by the partition wall 1c so as to increase the creepage distance to establish electrical insulation. In addition, similar to the above, the substantially circular partition wall 1b and other partition walls on the front and rear surface of the battery-connecting plate body 1 are formed in order to efficiently increase the creepage distance within a limited space to establish electrical insulation.

In the substantially E-shaped partition wall 1c, as shown in FIG. 3, an opening 1d is recessed in the shape of a step, and its tip is opened substantially in a U shape. A bottom 1e opposite to the opening 1d is communicated with the rear surface of the battery-connecting plate body 1, and an end 2b of the voltage-detecting terminal 2 extends toward the surface of the battery-connecting plate body via the bottom 1e.

Also, the connecting portion 4 to be connected with the connection terminal 32 in the battery-connecting plate body 1 includes a slide groove 1f, elastic claws 1g, a fitting bass 1h, regulating protrusions 1i, and a guide member 1k which are formed within the substantially E-shaped partition wall 1c.

Figure 4:
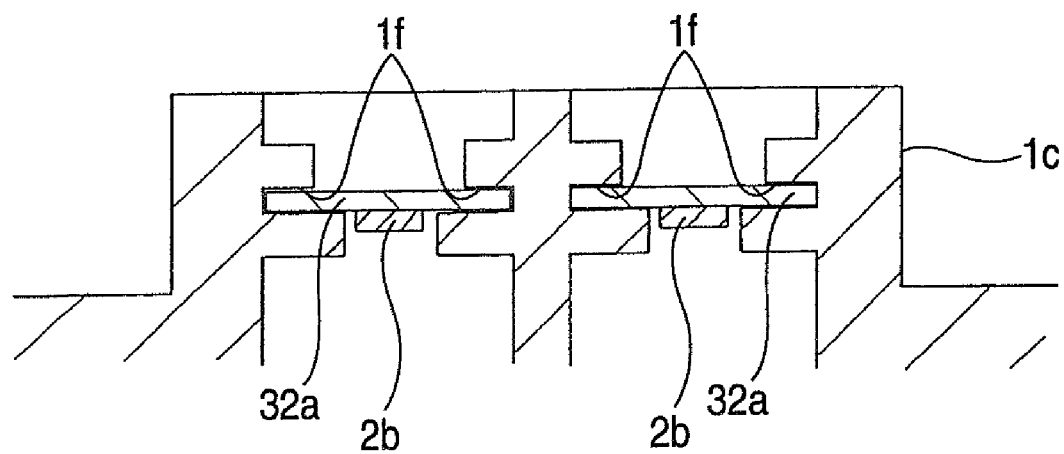
FIG. 4 is a partially enlarged sectional view taken along line Y1-Y1 in FIG. 2.

The slide groove 1f, as shown in FIGS. 3 and 4, is formed in a substantial U shape, in longitudinal sectional view, within the substantially E-shaped partition wall 1c so as to extend along the surface (constituent surface) of the battery-connecting plate body 1 over a required length from above a substantially U-shaped opening portion formed at its tip on the side of the opening 1d toward the bottom 1e, and is provided so as to face both the positive electrode and the negative electrode.

Further, the end 2b of the voltage-detecting terminal 2 extends at least below a region where the slide groove 1f reaches so as to be electrically connected to the tip 32d of the connection terminal 32 engaged with the slide groove 1f.

Figure 5:
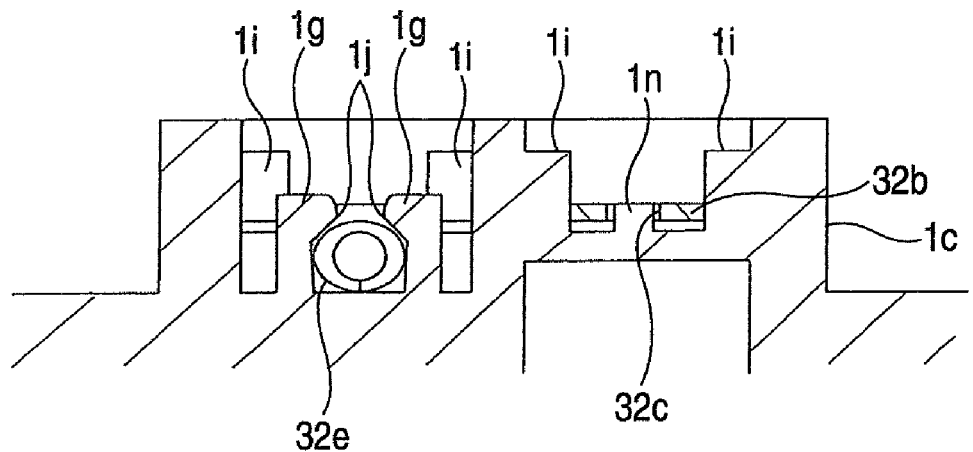
FIG. 5 is a partially enlarged sectional view taken along line Y2-Y2 in FIG. 2.

A pair of the elastic claws 1g, as shown in FIGS. 3 and 5, protrude upwardly from the lower stage of the bottom surface on the side of the substantially E-shaped recessed opening 1d so as to face each other with a required width to sandwich the base 32e of the connection terminal 32 to which the electric wire 31 is connected, and their apexes are respectively formed with barbs 1j which protrude toward the inside.

The fitting boss 1h, as shown in FIGS. 3 and 5, protrudes from the center of the upper stage of the bottom surface on the side of the substantially E-shaped opening 1d between the slide groove 1f and the elastic claws 1g so as to be fitted into a fitting hole 32c provided in the narrow portion 32b of the connection terminal 32.

As shown in FIG. 5, the regulating protrusions 1i are formed in a rectangular shape so as to sandwich the narrow portion 32b of the connection terminal 32 from both sides of the upper stage of the bottom surface on the side of the opening 1d at a required distance from the slide groove 1f, and is engaged with the narrow portion 32b of the connection terminal 32.

The guide member 1k, as shown in FIG. 2, includes a rib 1m which protrudes from the surface (constituent surface) of the battery-connecting plate body 1 in the vicinity of the opening d at a required distance from a central portion of the substantially E-shaped partition wall 1c, and a pin in which protrudes so as to sandwich the rib 1m at a required distance from both ends of the substantially E-shaped partition wall 1c. The guide member is also adapted to allow the electric wire 31 extending from a direction orthogonal to the connection terminal 32 connected to the connecting portion 4 of the battery-connecting plate body 1 to be inserted between the rib 1m and the pin 1n, thereby guiding the electric wire in a desired length.

Next, the procedure of fixing a connection terminal 32 in the structure for fixing a connection terminal according to the present embodiment configured as above will be described with reference to FIGS. 6 to 8.

Figure 6:
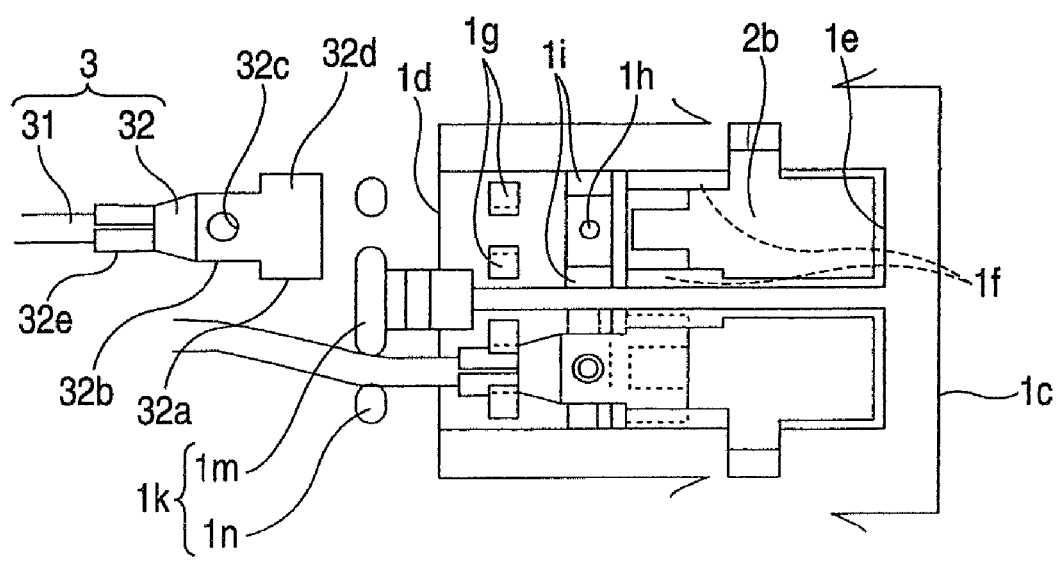
FIG. 6 is an explanatory view illustrating the fitting procedure of a connection terminal.
Figure 7:
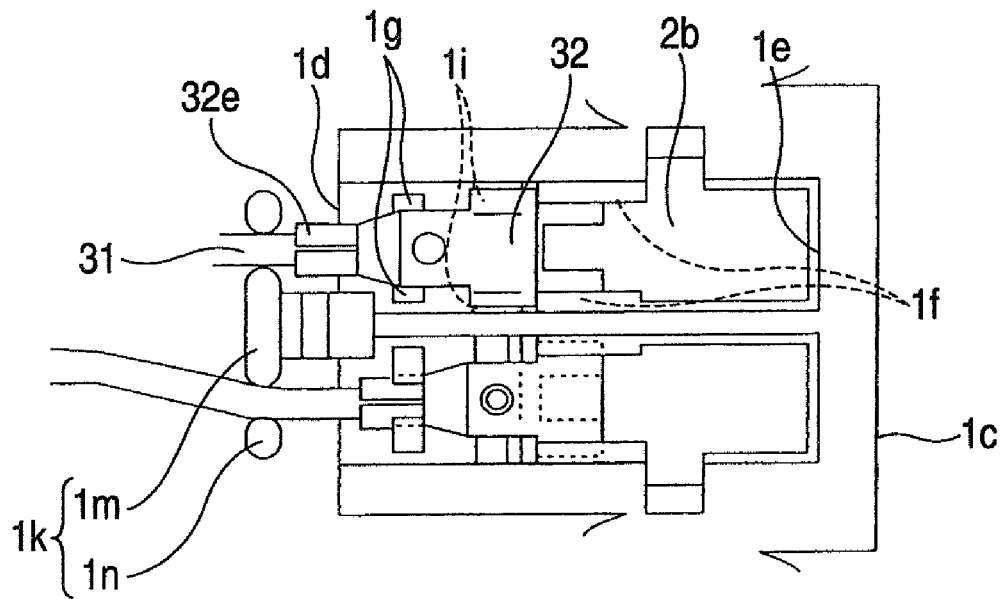
FIG. 7 is an explanatory view illustrating the fitting procedure of the connection terminal subsequent to FIG. 6.

First, in a state where the base 32e of the connection terminal 32 is slightly inclined so as to be located above, the tip 32d of the connection terminal 32 is fitted to a mouth of the guide groove 1f formed in the battery-connecting plate body 1 (see FIGS. 6 and 7).

Figure 8:
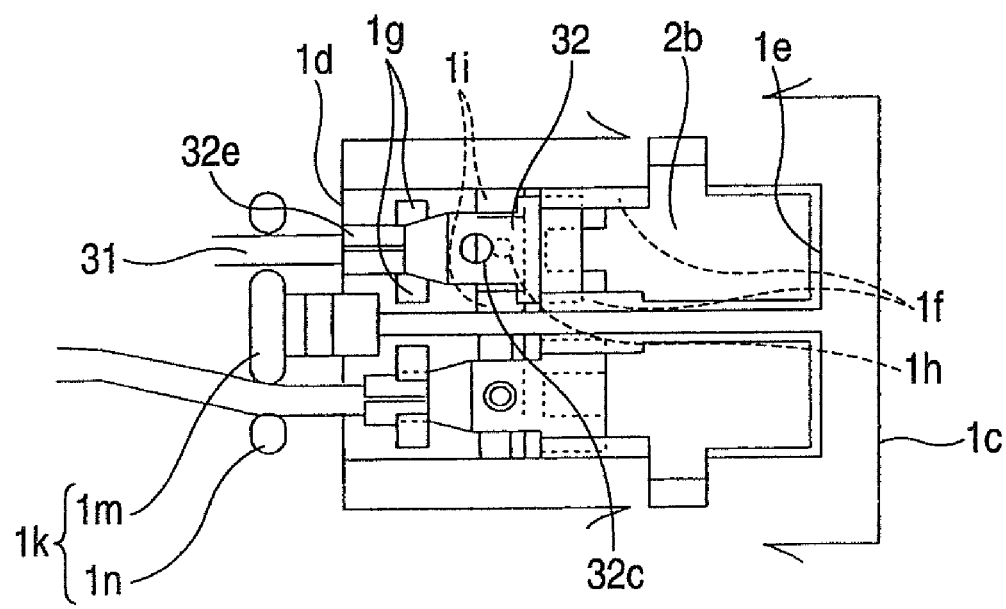
FIG. 8 is an explanatory view illustrating the fitting procedure of the connection terminal subsequent to FIG. 7.

Then, the tip 32d is inserted into the slide groove 1f by pushing in the connection terminal 32 (refer to the upper portion of FIG. 8). At this time, the tip 32d is slightly deformed elastically by pushing in the connection terminal 32 in a slightly inclined state, so that the connection terminal 32 is urged against the surface of the battery-connecting plate body 1.

Next, if the fitting boss 1h protruding from the center of the bottom surface on the side of the opening 1d is located in the fitting hole 32c provided in the narrow portion 32b of the connection terminal 32, the base 32e of the connection terminal 32 is pushed against the battery-connecting plate body 1 to fit the fitting boss 1h into the fitting hole 32c (refer to the lower portion of FIG. 8).

Simultaneously with the fitting operation, the base 32e of the connection terminal 32 is fitted into the elastic claws 1g so as to come into pressure contact with the lower stage of the bottom surface on the side of the opening 1d, and the narrow portion 32b of the connection terminal 32 is fitted between the regulating protrusions 1i, whereby the connection terminal 32 is completely fixed to the connecting portion 4 of the battery-connecting plate body 1. In addition, whether or not the fitting boss 1h is located in the fitting hole 32c can be confirmed with the naked eye, but it is transmitted to an operator's hand even through the senses. Therefore, it can be confirmed by both of them.

Simultaneously with the completion of the fitting operation, the end 2b of the voltage-detecting terminal 2 and the tip 32d of the connection terminal 32 engaged with the sliding groove 1f can be electrically connected to each other.

Then, the electric wire 31 is inserted between the rib 1m and the pin in serving as the guide member 1k to guides the electric wire 31 in a desired direction, thereby completing a series of operations.

According to the present embodiment, the connection terminal 32 can be easily and firmly fixed to the wiring board without using any terminal screw by inserting and fitting the plate-shaped tip 32d of the connection terminal 32 into the slide groove if recessed into the substantially E-shaped partition wall 1c formed in the battery-connecting plate body 1, fitting the fitting boss 1h into the fitting hole 32c, fitting the base 32e of the connection terminal 32 into the elastic claws 1g, and the narrow portion 32b of the connection terminal 32 between the regulating protrusions 11.

Although the structure for fixing a connection terminal to the wiring board according to the present embodiment has been described hitherto, this is similarly applicable to a connection terminal fixing method. In addition, although the above-described embodiment illustrates an example of the preferred embodiment of the invention, the invention is not limited thereto, and it can be modified in various ways without departing the scope thereof.

What is claimed is:

1. A structure for fixing a connection terminal to a wiring board comprising:
    a connection terminal, including a base and a plate-shaped tip connected to the base, wherein the base is connected to an electric wire, the plate-shaped tip is provided at a longitudinal end of the terminal that is opposite the base portion, and the plate-shaped tip includes opposing ends in a width direction of the terminal; and
    a wiring board including a slide groove and elastic claws, wherein the elastic claws protrude upwardly from the wiring board to sandwich the base therebetween, and the slide groove is engaged with both of the ends of the tip by sliding the terminal in longitudinal direction,
    wherein a fitting hole is provided in the tip, and a fitting boss which is engaged with the fitting hole protrudes from the wiring board.

2. A structure for fixing a connection terminal to a wiring board comprising:
    a connection terminal, including a base and a plate-shaped tip connected to the base, wherein the base is connected to an electric wire, the plate-shaped tip is provided at a longitudinal end of the terminal that is opposite the base portion, and the plate-shaped tip includes opposing ends in a width direction of the terminal; and
    a wiring board including a slide groove and elastic claws, wherein the elastic claws protrude upwardly from the wiring board to sandwich the base therebetween, and the slide groove is engaged with both of the ends of the tip by sliding the terminal in a longitudinal direction,
    wherein the tip is formed substantially in a T shape by a wide portion and a narrow portion which are fitted into the slide groove, and the wiring board has regulating protrusions that sandwich the narrow portion therebetween and suppress pulling-out of the connection terminal.

3. A structure for fixing a connection terminal to a wiring board comprising:
    a connection terminal, including a base and a plate-shaped tip connected to the base, wherein the base is connected to an electric wire, the plate-shaped tip is provided at a longitudinal end of the terminal that is opposite the base portion, and the plate-shaped tip includes opposing ends in a width direction of the terminal; and
    a wiring board including a slide groove and elastic claws, wherein the elastic claws protrude upwardly from the wiring board to sandwich the base therebetween, and the slide groove is with both of the ends of the tip by sliding the terminal in a longitudinal direction,
    wherein the slide groove comprises opposing substantially U shaped members in a longitudinal sectional view, and
    wherein a fitting hole is provided in the tip, and a fitting boss which is engaged with the fitting hole protrudes from the wiring board.

4. A structure for fixing a connection terminal to a wiring board, comprising
    a connection terminal, including a base and a plate-shaped tip connected the base, wherein the base is connected to an electric wire, the plate-shaped tip is provided at a longitudinal end of the terminal that is opposite the base portion, and the plate-shaped tip includes opposing ends in a width direction of the terminal; and
    a wiring board including a slide groove and elastic claws, wherein the elastic claws protrude upwardly from the wiring board to sandwich the base therebetween, and the slide groove is engaged with both of the ends of the tip by sliding the terminal in a longitudinal direction,
    wherein the wiring board includes another terminal that extends below the plate shaped tip of the connection terminal, wherein the plate-shaped tip is electrically connected to the other terminal when the slide groove is engaged with the ends of the tip.

* * * * *